United States Patent [19]

Feinleib

[11] 3,737,877

[45] June 5, 1973

[54] DATA STORAGE SYSTEM WITH COARSE AND FINE DIRECTING MEANS

[75] Inventor: Julius Feinleib, Birmingham, Mich.

[73] Assignee: Energy Conversion Devices, Inc., Troy, Mich.

[22] Filed: Sept. 24, 1970

[21] Appl. No.: 75,002

[52] U.S. Cl. ......................................340/173 LT, 340/173 LM, 340/173 LS, 346/76 L, 350/160 R, 350/289, 350/DIG. 1

[51] Int. Cl. ......G11c 13/04, G01d 15/14, G02b 5/08

[58] Field of Search .................340/173 LM, 173 LT, 340/173 LS; 350/288, 289, 160 R, DIG. 1; 346/76 L, 108, 109; 350/160 R, DIG. 1

[56] References Cited

UNITED STATES PATENTS

| | | | |
|---|---|---|---|
| 3,530,441 | 9/1970 | Ovshinsky | 340/173 LS |
| 3,226,696 | 12/1965 | Dove | 340/173 LM |
| 3,535,684 | 10/1970 | Raymond | 340/173 LM |
| 3,119,987 | 1/1964 | Slavin | 340/174.1 C |
| 2,335,659 | 11/1943 | Fraenckel | 340/173 LM |
| 3,034,111 | 5/1962 | Hoagland | 340/174.1 C |
| 3,506,779 | 4/1970 | Brown | 346/76 L |
| 3,573,471 | 4/1971 | Kolb | 340/173 LM |
| 3,441,949 | 4/1969 | Rolon | 346/108 |
| 3,148,354 | 9/1964 | Schaffert | 340/173 LT |
| 3,438,050 | 4/1969 | Aschenbrenner | 340/173 LM |
| 3,529,300 | 9/1970 | McDaniel | 340/173 LM |
| 3,391,970 | 7/1968 | Sincerbox | 340/173 LM |

OTHER PUBLICATIONS

Dakss, "Optical Memory, Display and Processor Elements Using Amorphous Semiconductors," IBM Technical Disclosure Bulletin, Vol. 13, No. 1 6/70, pp. 96–98

Blanchard, "Hologram Readout System," 2/69, IBM Technical Disclosure Bulletin, Vol. 11 No. 9, p. 1105

*Primary Examiner*—Bernard Konick
*Assistant Examiner*—Stuart Hecker
*Attorney*—Sidney Wallenstein, Charles B. Spangenberg, Russell E. Hattis and Harry V. Strampel

[57] ABSTRACT

An optical memory for a data processor comprising an optical memory disc having concentric data tracks, a first coarse adjustment device for selectively directing a laser beam onto each of widely spaced areas across the disc and a second fine adjustment device for selecting the desired track within the selected area.

18 Claims, 3 Drawing Figures

INVENTOR.
Julius Feinleib
BY
Barnard, McGlynn & Reising
ATTORNEYS

DATA STORAGE SYSTEM WITH COARSE AND FINE DIRECTING MEANS

This invention relates to data storage systems and particularly to apparatus for selectively locating an energy beam relative to a data storage medium for data transfer purposes.

The storage of data in an optically mutable medium is now well known. Such storage is typically accomplished by arranging discrete locations of the medium in a two-dimensional array, each location in the array being capable of assuming either of two discrete optical states (and being reset to either of the same by momentary application of electromagnetic energy thereto) and further being identifiable by means of a location address. One example of such an optical storage system is described in the co-pending application Ser. No. 12,622 (now U.S. Pat. No. 3,696,344) entitled "Optical Mass Memory Employing Amorphous Thin Films" and filed Feb. 19, 1970 in the name of Julius Feinleib and Robert F. Shaw. In that system, an optical memory is formed by a thin film of material capable of being locally switched between a generally amorphous atomic structural state having one set of optical qualities and another more ordered crystalline-like atomic structural state having a second markedly different set of optical qualities. An energy beam, such as a laser beam, is employed as the data transfer medium to write data into the discrete film locations as well as to read that data when required.

The data storage locations in an optical memory are typically ordered according to some pre-established plan for systematic access. A particularly favored plan involves the formation of a thin film memory disc wherein the locations are assembled into concentric but radially spaced tracks, each track comprising a distributed plurality of discrete locations. To provide high speed access to the locations, it is necessary to cause the data transfer beam to be displaced over the disc surface in a generally radial fashion and to precisely locate the beam on the selected track. The disc itself is typically rotatable about a central axis to cause the locations in the selected track to sweep past the data transfer beam. Even though the distances between the tracks are extremely small, typically measurable in microns, the physical forces which are generated by the extremely high speed translation of the apparatus for sweeping the beam work practical limits on the selection speed and accuracy which can be realized in a prior art system.

In accordance with the present invention, the physical requirements of a data transfer beam displacement apparatus are substantially relieved thus to permit an increase in data location selection speed and accuracy. In general this is accomplished by dividing the beam location function into two separate stages, the first stage effecting a coarse position selection and the second stage effecting a fine position selection. Accordingly, for each setting of the first stage of adjustment, several settings of the second stage of adjustment are possible giving rise to a large number of position selections while splitting the selection function between two separate but interdependent instrumentalities.

By dividing the selection function according to the present invention, the position tolerances for individual components of the beam positioning system are significantly relaxed yet a highly accurate position selection is achieved. For example, the use of lenses, pinhole apertures or other focusing means in the fine selection stage permits relatively wide variation in the position of the incoming beam from the coarse selection stage without the loss of position accuracy.

Moreover, the division of the selection function between coarse and fine adjustments greatly reduces the physical distance through which any mechanical component must be displaced to effect a sweep of the transfer beam. This reduces the displacement force requirements for those components and also permits greater beam displacement or sweep speed in moving from one data track to another. Access speed to data storage systems is often of great importance and, thus, the present invention may work to great advantage in data processing systems.

According to a specific feature of the present invention, data detection may be accomplished using a single set of optical devices to direct an energy beam both into and out of the storage medium. In general, this is accomplished by sensing data conditions in the medium according to the intensity of reflected signal, the transfer beam being reflected back through a substantial portion of its own input path before being diverted by a beam splitter or the like into a detector. Certain optical devices thus operate in both an input and output mode.

In a preferred application or embodiment of the invention as hereinafter described in greater detail an optical data storage medium comprises a series of parallel spaced data tracks, each track comprising a plurality of distributed storage locations capable of assuming at least two discrete optical states. Data is transferred between the medium and an external data processor by means of an optical beam, such as a laser beam, this beam being directed onto individual tracks by a first selection means which directs the beam selectively into one of a plurality of parallel spaced paths representing groups of data tracks and a second adjustment means which selectively displaces at least a portion of the selected beam path by increments representing the spacing between the individual tracks. As will be obvious to those of ordinary skill in the art, the tracks may be arranged concentrically on a disc or linearly on a linear medium or in such other pattern as is found advantageous. As will also be apparent to those of ordinary skill in the art, the term "beam" as used herein refers to a uniform and highly collimated quantity of electromagnetic energy including an optical ray as well as beams of more macroscopic cross section.

The various features and advantages of the invention will become more apparent from a reading of the following specification which describes specific embodiments of the invention, this specification to be taken with the accompanying drawing of which:

Figure 1:
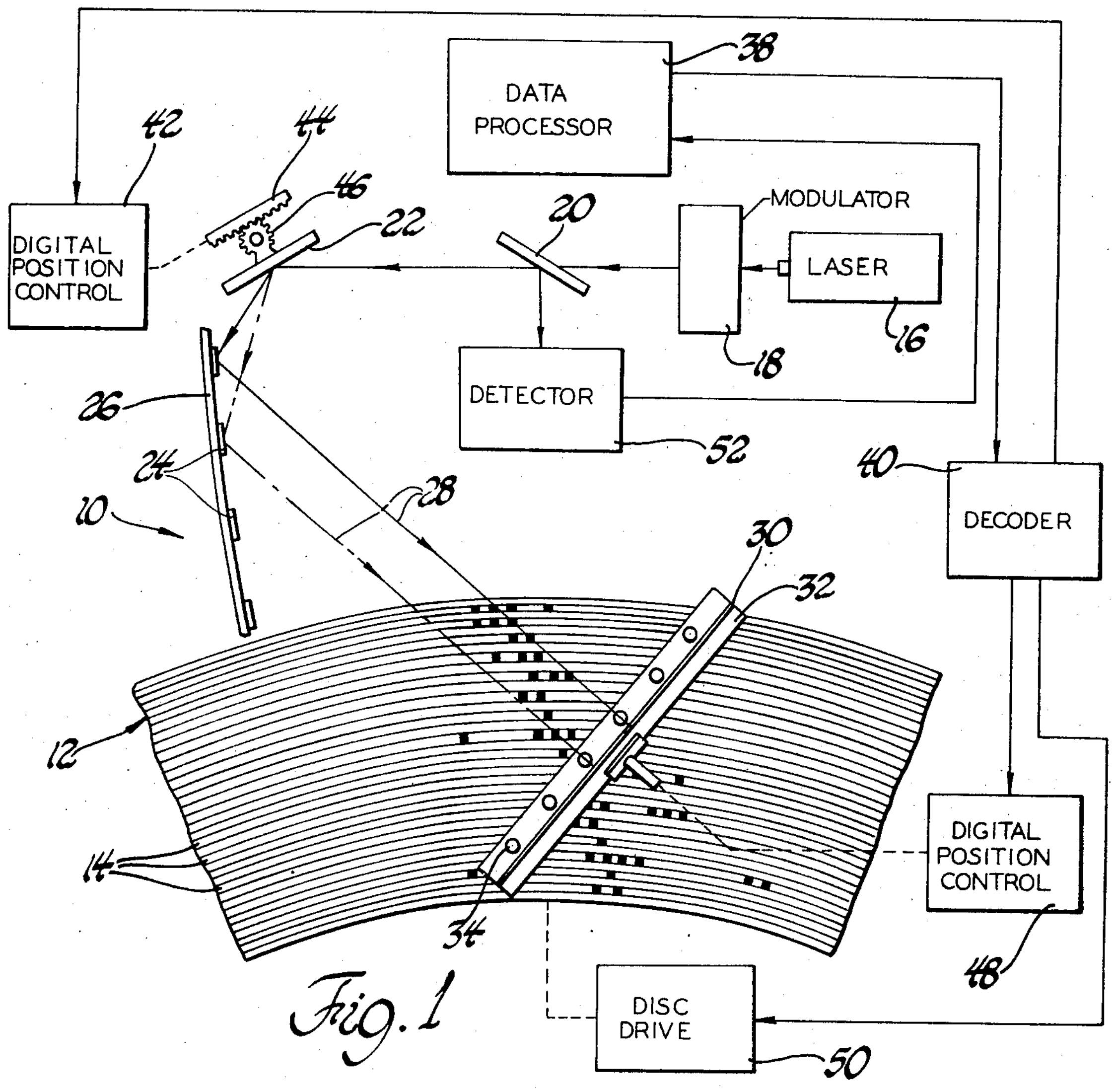
FIG. 1 is a part schematic and part block diagram of an illustrative embodiment of the invention.

Referring to FIG. 1, an optical data storage system 10 for the storage and retrieval of data in digital or analog form is shown to comprise an optical memory disc 12 having an optically mutable surface defining a plurality of parallel and uniformly radially spaced tracks 14. The tracks 14 are not drawn to scale in FIG. 1, but are greatly exaggerated for purposes of illustration. Each of the tracks 14 is subdivided along its length into individual data storage locations, each location being capable of assuming either of at least two discrete optical states. In the illustrated example, digital storage is presumed and, thus, only two optical states are employed for data storage purposes. The preferred material from which to form the mutable surface of the disc 12 is identified in the co-pending application Ser. No. 12,622 as a thin film of semiconductor material which can be switched between a first generally amorphous atomic structural state and a second more ordered crystalline-like atomic structural state by the application of a laser beam. The optical qualities of the semiconductor film vary substantially between the first and second states as set forth in the co-pending application and, thus, each state may be taken to represent a coded digital quantity for data storage purposes. In the embodiment of FIG. 1, the optical quality which is utilized for data storage purposes is the reflectivity or absorptivity of the material to a selected radiant energy transfer beam frequency. However, it is to be understood that qualities such as opaqueness and light scattering ability may also be utilized.

For data transfer to and from the disc 12, a laser 16 produces a highly collimated output beam which is directed through a modulator 18 for intensity variation and a beam splitter 20 to the reflective surface of a mirror 22. Mirror 22 is variable in angular position thus to direct the laser beam selectively onto spaced, parabolically oriented, flat reflectors 24 carried by a fixed support 26. As shown in FIG. 1, the mirror 22 is located at the focus of an imaginary parabola containing the surfaces of reflectors 24 such that the reflectors 24 cause the laser beam to be selectively directed along a plurality of spaced parallel paths 28 to a reflecting and focusing device 30 which is disposed over the disc 12 to direct the beam normally onto a track 14 in the disc 12. The path 28 along which the laser beam is directed depends upon the angularity of the mirror 22, only one such path 28 being selected at any given time. The mirror 22 and the parabolically distributed reflectors 24, thus, serve as a coarse adjustment means for placing the laser beam in one of relatively few, widely spaced positions taken radially across the disc 12. Each of the widely spaced positions represents a group of data tracks in the disc 12 and further positioning of the beam within any selected group is accomplished by movement of device 30 as will be hereinafter described. Other optical devices for redirecting radiant energy beams along spaced paths may be substituted for the arrangement of the mirror 22 and the reflectors 24 to produce essentially the same effect. One such device is constructed using the so-called fiber optics in a bundle having the desired input and output beam distribution. Also, the alignment of the beam with paths 28 may be accomplished by means of electro-optical devices responsive to suitable electrical signals to provide related beam deflection without corresponding mechanical movement. In addition, it is apparent that the discontinuous flat reflectors 24 may be replaced by a continuous sweeping surface albeit such a surface may be more expensive to fabricate.

The fine adjustment device 30 comprises a flat reflector 32 which is disposed adjacent and across the tracks 14 of the disc 12 in a skewed fashion, i.e., non-radial, to displace the beam from a path 28 into a short orthogonal path thus to direct the incoming laser beam downwardly through one of a plurality of uniformly spaced lenses 34 onto the mutable surface of the disc 12. The mirror reflector 32, thus, redirects the final leg of the incoming beam so as to be at least substantially normal to the plane of the disc 12. Fine adjustment device 30 is selectively displaceable along a path parallel to the incoming laser beam direction for selectively displacing the selected beam path by increments representing the spacing between the data tracks in the data track groups previously defined. The movement of device 30 relative to disc 12 is such as to maintain device 30 orthogonal across the beam paths 28, and to maintain the downwardly projected legs. Again, electro-optical devices requiring little or no mechanical motion may be substituted for device 30.

In the embodiment of FIG. 1, there are mn data tracks 14 on the surface of the disc 12 where m represents the number of individual beam paths 28 through which the laser beam may be directed by suitable adjustment of the angularity of mirror 22, and n represents the number of incremental positions through which the fine adjustment device 30 may be moved over a projection of the radial distance between lenses 34. In an example selected purely for illustration purposes, there are 36 data tracks 14 on the surface of disc 12 and six beam paths 28 which may be selected by rotation of the mirror 22. Therefore, each beam path 28 represents a group of six spaced data tracks, the fine selection of any one of these data tracks being effected by displacement of the fine adjustment device 30. There are, of course, many more tracks than 36 in an actual disc.

Figure 2:
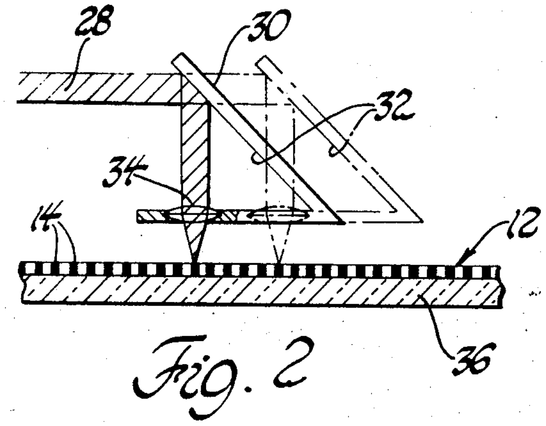
FIG. 2 is a cross sectional view of a portion of the apparatus of FIG. 1.

As shown in FIG. 2, the incoming beam is parallel to the surface of disc 12 and the angled reflector 32 of device 30 is movable in a direction parallel to the incoming optical path 28 so as to cause the converging lens 34 to be moved incrementally over a total distance of six consecutive data tracks 14, again this number being selected only to be consistent with the above-illustrative example. The movement of device 30 must be rectilinear and parallel to the direction incoming paths 28 such that the movement linearly displaces only the orthogonal downwardly projected beam leg without moving the selected lens 34 out of the selected path 28.

It can be seen in FIG. 2 that the tolerable error in the angular orientation of the mirror 22 in selecting any one of the paths 28 is comparatively large since the converging lenses 34 will tolerate a fairly wide incoming beam position variation without substantial variation in the point at which the beam is focused at the surface of disc 12. Assuming a good quality lens, the beam need only be within the confines of the lens to focus properly. The beam must not, of course, vary so much as to fall on the adjacent lens. It is apparent that pinhole apertures may be substituted for the lenses 34, thus, permitting the use of a fairly wide beam. Moreover, rotation of device 30 about its own longitudinal axis may be employed to effect the fine displacement assuming a readout arrangement is used which does not place a high requirement of the angle with which the beam intersects the disc 12. The beam must also be kept in focus.

It will be noted in FIG. 2 that the semi-conductor thin film defining the tracks 14 in the disc 12 is disposed over a rigid reflective material 36. Thus, for each data location which is in a transparent or transmissive condition, the incoming laser beam is transmitted through the semi-conductor material in the data location to the reflective surface of material 36. The laser beam is then reflected back through the lens 34 onto the reflective surface 32 and thence back along the incoming beam path 28 for purposes to be described. If the data location through which the laser beam is directed has been placed in the opaque or absorptive condition, little or no reflection results.

Looking again to FIG. 1, system 10 comprises a data processor 38 such as a general purpose computer which is capable of outputing data location address information to a decoder 40. Decoder 40 is connected first to a digital position control transducer 42, an electromechanical device responsive to coded electrical input signals to produce corresponding displacements of a rack 44. The rack is in meshing engagement with the teeth of a pinion 46 which is operatively connected to the mirror 22. Thus, the data processor 38 is in control of the angular position of mirror 22 and the beam path 28 through which the laser beam is to be directed.

Decoder 40 is also connected to a second digital position transducer 48 which operates in a manner similar to the transducer 42 to control the position of the fine adjustment device 30 relative to the disc 12. Decoder 40 typically outputs signals to the devices 42 and 48 simultaneously, thus, to effect the positioning of both mirror 22 and fine adjustment device 30 relative to the disc 12. Finally, the decoder 40 is connected to a disc drive 50 which rotates disc 12 relative to the fine adjustment device 30 at a preselected speed to cause the data locations of a selected track 14 to sweep past the data transfer beam. A serial readout is, thus provided. The disc drive 50 may alternatively be controlled directly by a clocked function from the data processor 38. Data processor 38 is directly connected to the modulator 18 to vary the intensity of the laser beam in accordance with whether a read or write operation is being carried on.

During a read operation, the digital information quantities in the reflected laser beam are directed back along the beam path 28 to the reflectors 24, then to the mirror 22 and into the beam splitter 20. The beam splitter 20 operates to reflect the reversely incoming beam portions to a photodetector 52 which produces two output signal levels, the particular output level depending upon the intensity level of the incoming optical beam. The detector 52 is connected to the data processor 38 for data transfer purposes.

Figure 3:
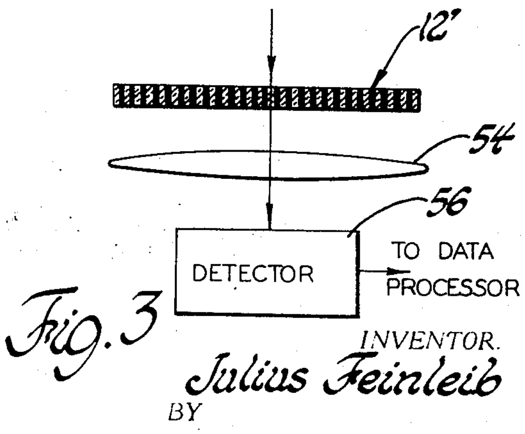
FIG. 3 is a schematic view of an alternative data detection arrangement for the system of FIG. 1.

FIG. 3 illustrates an alternative detection scheme wherein the disc 12' is constructed such that data locations which are transmissive or transparent to the incoming energy beam permit the beam to pass directly through the disc. On the side of the disc 12' opposite the incoming data transfer beam is disposed a large converging lens 54 for directing the incoming beam onto a detector 56. Thus, during rotation of the disc 12, the detector 56 experiences light and dark input conditions corresponding to the light transmitting and light absorbing states of the individual data locations in the selected track through which the beam is directed. Detector 56 produces a correspondingly level-changing output signal to the data processor 38 in the system 10 of FIG. 1. Other usable and practical data detection schemes will be apparent to those skilled in the art.

OPERATION

Although the operation of the system 10 is believed to be readily apparent from the foregoing, a brief summary of a typical operation will now be made.

To effect a serial readout of a given data track 14 on disc 12, processor 38 outputs an address unique to that track. The address is decoded by decoder 40 and appropriate signals are sent to transducers 42 and 48. Transducer 42 causes rotation of mirror 22 to direct the laser beam along one of the parallel paths 28. This effects a coarse positioning of the data transfer beam from laser 16 relative to the tracks 14 on disc 12. To select a particular track 14 from the group of tracks comprehended by the selected beam path 28, transducer 48 causes linear displacement of device 30 parallel to beam path 28 until the laser beam falls directly on the desired track. Disc drive 50 rotates the disc 12 such that the data locations of the selected track sweep serially past the beam, causing light to be reflected to decoder 52 in a sequence of pulses determined by the optical states of the data locations.

It is to be understood that many variations to the illustrative embodiment described herein will occur to those of ordinary skill in the art and thus the foregoing description is not to be construed in a limiting sense. For example, an ordinary light source with suitable collimating devices may be substituted for laser 16 in some applications. The data storage material may be replaced by other materials such as magnetic or photographic film. Moreover, the disc itself may be replaced with tape or other nonrigid storage material. These examples are not intended to be exhaustive but only illustrative of the variety of embodiments in which the invention may reside.

The embodiments of the invention in which an exclusive property or privilege is claimed are defined as follows:

1. In a data storage system including a storage medium comprising respective groups of spaced and parallel data tracks each having a plurality of distributed electromagnetic beam responsive storage locations capable of being set either to a first or second discrete state, there being many data tracks in each group of data tracks; and a source of a beam of electromagnetic energy to which said data tracks are responsive; the improvement comprising data transfer apparatus for directing said beam of electromagnetic energy onto a selected data track on said storage medium comprising: coarse beam directing means for selectively directing said beam along any one of a plurality of parallel spaced beam paths respectively spaced from the adjacent paths by effective distances corresponding to the distances spanned by said respective groups of data tracks on said storage medium; and fine beam directing means for selectively directing said beam directed by said coarse beam directing means along any of said respective parallel spaced beam paths onto any of the data tracks of the associated group of data tracks of said storage medium; said coarse beam directing means including first reflector means for varying the angular direction of the beam incrementally and second reflector means for redirecting the beam from the first reflector means along said parallel spaced paths.

2. Apparatus as defined in claim 1 including data source means for providing signals identifying the data track to be selected, and decoder means responsive to the signals for operating the coarse and fine beam directing means.

3. Apparatus as defined in claim 1 wherein the second reflector means is parabolic in shape, said first reflector means being effectively disposed at the focus of the second reflector means.

4. Apparatus as defined in claim 1 wherein the fine beam directing means includes beam deflecting means disposed proximate and across said respective groups of data tracks for directing said beam incident thereon from any one of said parallel spaced paths onto a selected track in any of said groups of tracks on said storage medium, and means for effecting progressive relative movement between said beam deflecting means and said storage medium in a direction transverse to the individual tracks in the group involved.

5. In a data storage system including a disc storage medium comprising respective groups of spaced and parallel data tracks disposed in concentric circles on the disc, each track having a plurality of distributed electromagnetic beam responsive storage locations capable of being set either to a first or second discrete state, there being many data tracks in each group of data tracks; and a source of a beam of electromagnetic energy to which said data tracks are responsive; the improvement comprising data transfer apparatus for directing said beam of electromagnetic energy onto a selected data track on said storage medium comprising: coarse beam directing means for selectively directing said beam along any one of a plurality of parallel spaced beam paths respectively spaced from the adjacent paths by effective distances corresponding to the distances spanned by said respective groups of data tracks on said storage medium; and fine beam directing means for selectively directing said beam directed by said coarse beam directing means along any of said respective beam paths onto any of the data tracks of the associated group of data tracks of said storage medium; said fine beam directing means including a reflector disposed proximate and across the disc in a skewed fashion relative to a radius of the disc.

6. In a data storage system including a storage medium comprising respective groups of spaced and parallel data tracks each having a plurality of distributed electromagnetic beam responsive storage locations capable of being set either to a first or second discrete state, there being many data tracks in each group of data tracks; and a source of a beam of electromagnetic energy to which said data tracks are responsive; the improvement comprising data transfer apparatus for directing said beam of electromagnetic energy onto a selected data track on said storage medium comprising: coarse beam directing means for selectively directing said beam along any one of a plurality of parallel spaced beam paths respectively spaced from the adjacent paths by effective distances corresponding to the distances spanned by said respective groups of data tracks on said storage medium; and fine beam directing means for selectively directing said beam deflected by said coarse beam directing means along any of said respective beam paths onto any of the data tracks of the associated group of data tracks of said storage medium, said fine beam directing means including beam reflecting means disposed proximate and across said respective groups of data tracks for directing said beam incident thereon from any one of said spaced parallel beam paths onto a selected track in any of said groups of tracks on said storage medium and a plurality of spaced lenses between the beam reflecting means and the tracks and equal in number to the number of said groups.

7. Apparatus as defined in claim 6 including means for displacing the beam reflecting means along an axis transverse to said spaced paths.

8. The apparatus of claim 6 wherein said beam reflecting means and lenses are carried on a common support structure which is movable transverse to said independent tracks.

9. In a data storage system including a storage medium comprising respective groups of spaced and parallel data tracks each track having a plurality of distributed electromagnetic beam responsive storage locations capable of being set either to a first or second discrete state, there being many data tracks in each group of data tracks; and a source of a beam of electromagnetic energy to which said data tracks are responsive; the improvement comprising data transfer apparatus for directing said beam of electromagnetic energy onto a selected data track on said storage medium comprising: coarse beam directing means including pivotably mounted means for selectively directing said beam from said electro-magnetic energy source along any one of a plurality of spaced beam paths which, at given points along the beam paths, are respectively spaced from the adjacent paths by effective distances corresponding to the distances spanned by said respective groups of data tracks on said storage medium, and fine beam directing means for selectively directing said beam directed by said coarse beam directing means onto any of the data tracks of the associated group of data tracks of said storage medium, said fine beam directing means including means for effecting progressive transverse relative movement between a beam from said beam directing means and the individual tracks in the group involved, and means for effecting progressive relative movement between said fine beam directing means and said storage medium in the direction along the track struck by the beam involved.

10. The apparatus of claim 9 wherein said storage locations of said storage medium are selectively settable at any time to either one of said discrete states by the application of electromagnetic energy thereto and remain in its set state after removal of all sources of energy therefrom.

11. The apparatus of claim 9 wherein said first and second discrete states of said storage locations of said storage medium respectively have substantially different beam directing qualities, and said beam of electromagnetic energy in only one of said states is directed by such storage locations in given discrete paths, and there is provided detector means for receiving energy directed by said storage locations of said storage medium when directed in said discrete paths.

12. The apparatus of claim 9 wherein said coarse beam directing means includes reflector means parabolic in shape and said pivorably mounted means is located at the focus of said parabolic reflector means.

13. Apparatus as defined in claim 9 including a data storage medium for said tracks, the medium having an optically mutable surface.

14. Apparatus as defined in claim 13 wherein the medium includes a reflective surface adjacent and parallel to the mutable surface.

15. Apparatus as defined in claim 9 including detector means responsive to the beam as affected by the storage locations for determining the data content thereof.

16. Apparatus as defined in claim 15 wherein the detector means includes an input portion adjacent said medium for receiving the beam through the data tracks.

17. Apparatus as defined in claim 15 wherein the detector means receives the beam as reflected from the data tracks.

18. Apparatus as defined in claim 17 including an optical beam source as said source of electromagnetic energy, a beam splitter in the beam path for transmitting the beam from the beam source to the coarse beam directing means and reflecting the beam reflected from the storage medium, the detector means being disposed to receive the beam as reflected from the beam splitter.

* * * * *